United States Patent
Yano et al.

(10) Patent No.: US 6,375,836 B1
(45) Date of Patent: Apr. 23, 2002

(54) FLUID FILTER

(75) Inventors: Kenji Yano; Kazuhiro Yoshida; Takeo Sugimoto, all of Hamakita; Takahiro Minowa, Wako, all of (JP)

(73) Assignees: Toyo Roki Seizo Kabushiki Kaisha, Shizuoka; Honda Giken Kogyo Kabushiki Kaisha, Tokyo, both of (JP)

(*) Notice: Subject to any disclaimer, the term of this patent is extended or adjusted under 35 U.S.C. 154(b) by 0 days.

(21) Appl. No.: 09/485,433

(22) PCT Filed: Jun. 10, 1999

(86) PCT No.: PCT/JP99/03097

§ 371 Date: Feb. 10, 2000

§ 102(e) Date: Feb. 10, 2000

(87) PCT Pub. No.: WO99/64134

PCT Pub. Date: Dec. 16, 1999

(30) Foreign Application Priority Data

Jun. 11, 1998 (JP) .......................................... 10-163989
Jun. 7, 1999 (JP) .......................................... 11-158908

(51) Int. Cl.[7] .......................... B01D 27/08; B01D 27/10
(52) U.S. Cl. ........................ 210/130; 210/440; 210/453; 210/455; 210/457; 210/DIG. 17
(58) Field of Search ................................ 210/130, 440, 210/453, 457, 443, 444, 455, DIG. 17

(56) References Cited

U.S. PATENT DOCUMENTS 2,631,732 A * 3/1953 Vocelka ........................ 210/169
5,374,355 A * 12/1994 Habiger et al. ............. 210/440

FOREIGN PATENT DOCUMENTS

| JP | 64-5608 | 1/1989 | |
| JP | 64-36007 | 3/1989 | |
| JP | 6-508294 | 9/1994 | |
| JP | 8-290014 | 11/1996 | |
| JP | 09136003 | * 5/1997 | ........... B01D/27/08 |
| JP | 10-33909 | 2/1998 | |
| JP | 11-506699 | 6/1999 | |

* cited by examiner

Primary Examiner—Matthew O. Savage
(74) Attorney, Agent, or Firm—Young & Thompson

(57) ABSTRACT

A spring 15 is crimpingly fixed to an element holding plate 14 of the fluid filter. Since the spring 15 is crimpingly fixed to the element holding plate 14, a material having a high elastic limit can be freely selected for the spring 15. At the assembling time, the spring 15 can be prevented from yielding to be elastically deformed, even when the size between the upper end of the element 12 and the crest of the filter case 11 fluctuates. As a result, it is possible to provide a fluid filter which requires no high sizing accuracy of the individual parts composing the fluid filter at the assembling time so that it can be easily assembled.

6 Claims, 7 Drawing Sheets

FLUID FILTER

CROSS REFERENCE TO RELATED APPLICATION

This is the 35 USC 371 national stage of international application PCT/JP99/03097, filed on Jun. 10, 1999, which designated the United States of America.

BACKGROUND OF THE INVENTION

The present invention relates to a fluid filter for filtering the oil of an automobile or the like.

The recycling consciousness enhanced in recent years has demanded the recovery of used oil filters for classified materials even when the oil filters are disposed of. We have proposed a vehicular fluid filter shown in FIG. 9 (in Japanese Patent Application No.HEI 9-260542) as an oil filter capable of classifying and recovering a cylindrical element of filter paper from a metallic inner cylinder holder.

An element 1 is assembled in a removable manner around an inner cylinder holder 2. On the lower end of the inner cylinder holder 2, there is axially press-fitted a flange portion 3 for supporting the lower end of the element 1. An element holding plate 4 is placed on the upper element end. At the inner side of the element holding plate 4, there is formed a fitted portion 4a to be fitted on the upper end of the inner cylinder holder 2. At the outer side of the element holding plate 4, there is formed a fitted portion 4a to be fitted on the upper end of the inner cylinder holder 2. At the outer side of the element holding plate 4, there is formed a pressure portion 4b for holding the upper end of the element 1. A relief valve 6 is projection-welded to the lower face of the element holding plate 4. Between the upper face of the pressure portion 4b of the element holding plate 4 and the crest of a filter case 5, there is sandwiched a check spring 4c. This check spring 4c is projection-welded to the element holding plate 4. The force of the pressure portion 4b for holding the element is generated when the check spring 4c is bent and deformed by the abutment against the crest of the filter case 5. The element 1 is axially sandwiched at its lower end by the flange portion 3 and at its upper end by the pressure portion 4b.

In the vehicular fluid filter of the prior art, however, the check spring 4c is projection-molded to the element holding plate 4. Therefore, the check spring 4c and the element holding plate 4 have to be made of weldable materials, but a material having a high elastic limit cannot be used for the check spring 4c. When the vehicular fluid filter is to be assembled, therefore, the height sizes of the individual parts composing the vehicular fluid filter have to be too accurate to provide a vehicular fluid filter of easy assembly.

Since the leading end of the inner cylinder holder 2 is cut sharp, on the other hand, it may be caught by the inner circumference of the element 1 when this element 1 is to be assembled with the inner cylinder holder 2 thereby to damage the inner circumference of the element 1. Therefore, this element 1 has to be carefully assembled with the inner cylinder holder 2.

Since the inner cylinder holder 2 and the flange portion 3 are composed of separate pieces, moreover, there is demanded not only the step of press-fitting the inner cylinder holder 2 axially onto the flange portion 3 but also a sizing accuracy for each part. This requires a step of forming each part highly accurately and press-fitting it so that a vehicular fluid filter of easy assembly cannot be provided.

SUMMARY OF THE INVENTION

It is, therefore, an object of the invention to provide a vehicular fluid filter of easy assembly.

According to one aspect of the invention, there is provided a fluid filter comprising: a cylindrical filter case having a lower end opened; a cylindrical element to be inserted into the filter case; an inner cylinder holder to be so assembled in the inner circumference of the element that the element can be extracted; an element holding plate fitted on the upper end of the inner cylinder holder for holding the upper end of the element; and a spring fixed on the element holding plate for urging the element holding plate elastically to the upper end of the element, wherein the element holding plate and the spring are crimpingly fixed.

Since the element holding plate and the spring are crimpingly fixed, according to this aspect, they can be jointed to each other even if they are made of different materials. Since a material having a higher elastic limit than that of the element holding plate can be freely selected for the spring, the spring can yield to prevent the plastic deformation even when the size between the upper end of the element and the filter case fluctuates. At the assembling time, therefore, the height sizes of the individual parts composing the vehicular fluid filter need not be accurate, and it is possible to provide a vehicular fluid filter of easy assembly.

According to this aspect, the spring steel is used for the check spring so that an elastic limit can be enlarged.

According to another aspect of this invention, the fluid filter further comprises a relief valve device welded to the element holding plate for acting according to the difference between the inside and outside pressures of the element, wherein the spring is crimpingly fixed at a portion different from the welded position of the relief valve device.

According to this aspect, the spring is crimpingly fixed at a portion different from the welded position of the relief valve device so that the fluid filter can be easily manufactured without being damaged at the welded portion at the crimping step.

According to another aspect of this invention, the spring includes leaf spring portions extended and protruded from the portion crimpingly fixed to the element holding plate so that the element holding plate is urged to the upper end of the element by the elastic force which is generated by bringing the warped leaf spring portions into abutment against the filter case.

According to this aspect, the element holding plate is urged by bringing the warped leaf spring portions into abutment against the filter case, so that the number of parts can be reduced.

According to this aspect, the inner cylinder holder is curved at its end portion so that the inner cylinder holder can be smoothly assembled in the inner circumference of the element without damaging the inner circumference of the element.

According to this aspect, the end portion of the inner cylinder holder is curved by folding it inward so that its structure is not complicated while enhancing the strength of the inner cylinder holder.

According to this aspect, the inner cylinder holder is molded of a synthetic resin so that its end portion can be easily curved.

According to this aspect, the end portion of the inner cylinder holder is diametrically reduced at its end portion so that it can be smoothly assembled in the inner circumference of the element without damaging the inner circumference of the element.

According to this aspect, the inner cylinder holder is molded integrally with the flange portion so that the number of parts can be reduced while eliminating the step of press-fitting the inner cylinder holder axially onto the flange portion, to facilitate the assembly and to enhance the strength of the inner cylinder holder by the flange portion.

According to another aspect of this invention, there is provided a fluid filter comprising an inner cylinder holder to be so assembled with the inner circumference of an element that the element can be extracted, wherein the fluid filter further comprises: a plate member arranged on the side of the end portion of the inner cylinder holder; and a packing sandwiched between the end portion of the inner cylinder holder and the plate member for establishing a seal between the end portion of the inner cylinder holder and the plate member, and wherein the end portion of the inner cylinder holder is molded integrally with the inner cylinder holder.

According to this aspect, the number of parts can be reduced while facilitating the assembly by molding the end portion integrally with the inner cylinder holder.

According to another aspect of this invention, there is provided a fluid filter comprising an inner cylinder holder to be so assembled with the inner circumference of an element that the element can be extracted, wherein the outer circumference of the inner cylinder holder, as confronting the inner circumference of the element, is formed in uneven shape and has openings formed at the places other than the ridges of the outer circumference for providing communication between the inside and outside of the inner cylinder holder.

According to this aspect, the inner circumference of the element is contacted only by the ridges formed on the outer circumference of the inner cylinder holder so that the inner cylinder holder can be easily assembled with little resistance. As a result, the open area of the inner circumference of the element can be substantially enlarged to reduce the flow resistance and lower the flow velocity at the openings thereby to improve the filtering efficiency.

According to another aspect of this invention, there is provided a fluid filter comprising: a cylindrical element; an inner cylinder holder to be so assembled in the inner circumference of the element that the element can be extracted; an element holding plate fitted on the end portion of the inner cylinder holder for holding the upper end of the element; and a relief valve device attached to the element holding plate for acting according to the difference between the inner and outer pressures of the element, wherein said relief valve device is arranged in the inner circumference of the element so that it can be used as a guide for inserting the relief valve device into the inner cylinder holder by bringing the inner circumference of the inner cylinder holder into abutment against the outer circumference of the relief valve device.

According to this aspect, when the inner cylinder holder is to be inserted into the element, the relief valve device can be utilized as a guide for inserting the inner cylinder holder thereby to smoothen the assembly.

According to another aspect of this invention, there is provided a fluid filter comprising: a cylindrical element; an inner cylinder holder to be so assembled in the inner circumference of the element that the element can be extracted; an element holding plate fitted on the end portion of the inner cylinder holder for holding the upper end of the element; and a relief valve device attached to the element holding plate for acting according to the difference between the inner and outer pressures of the element, wherein said relief valve device is arranged in the inner circumference of the element so that it can regulate the position of the inner cylinder holder for assembling the relief valve device into the inner cylinder holder by bringing the inner circumference of the inner cylinder holder into abutment against the outer circumference of the relief valve device.

According to this aspect, when the inner cylinder holder is assembled into the element, the relief valve device can be utilized as a member for positioning the inner cylinder holder thereby to improve the assembling accuracy.

According to another aspect of this invention, the crimped portion on the holding plate is crimpingly fixed on the spring.

According to this aspect, the crimped portion is crimped on the holding plate so that the yield of the spring can be improved (better than the case where the crimped portion is formed on the spring side). Even if a material having a higher elastic limit than that of the holding plate is freely selected for the spring, moreover, the crimping works can be facilitated to retain the crimping accuracy.

DESCRIPTION OF THE PREFERRED EMBODIMENTS

[First Embodiment]

Figure 1:
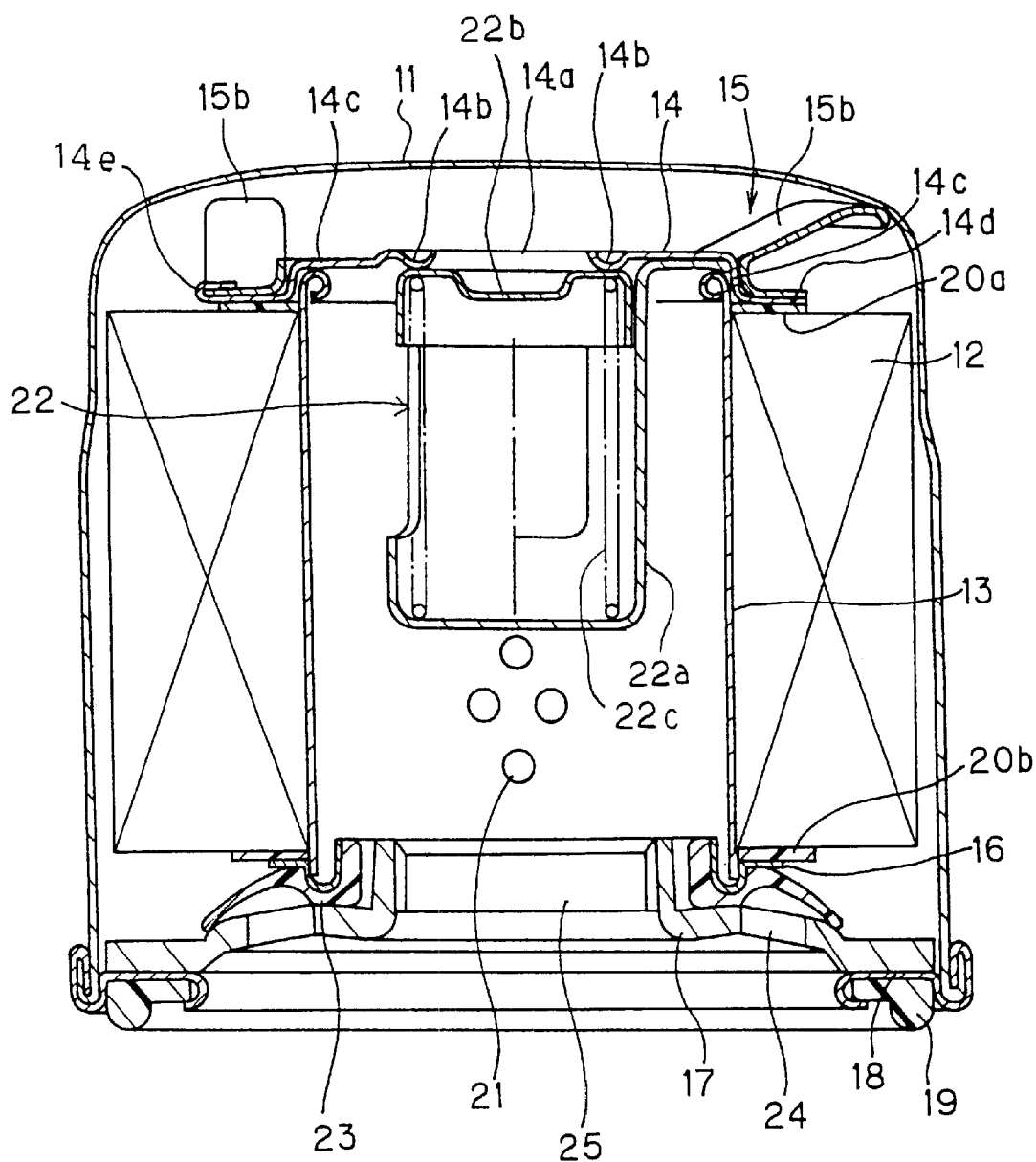
FIG. 1 is a section showing a vehicular fluid filter of a first embodiment.
Figure 2:
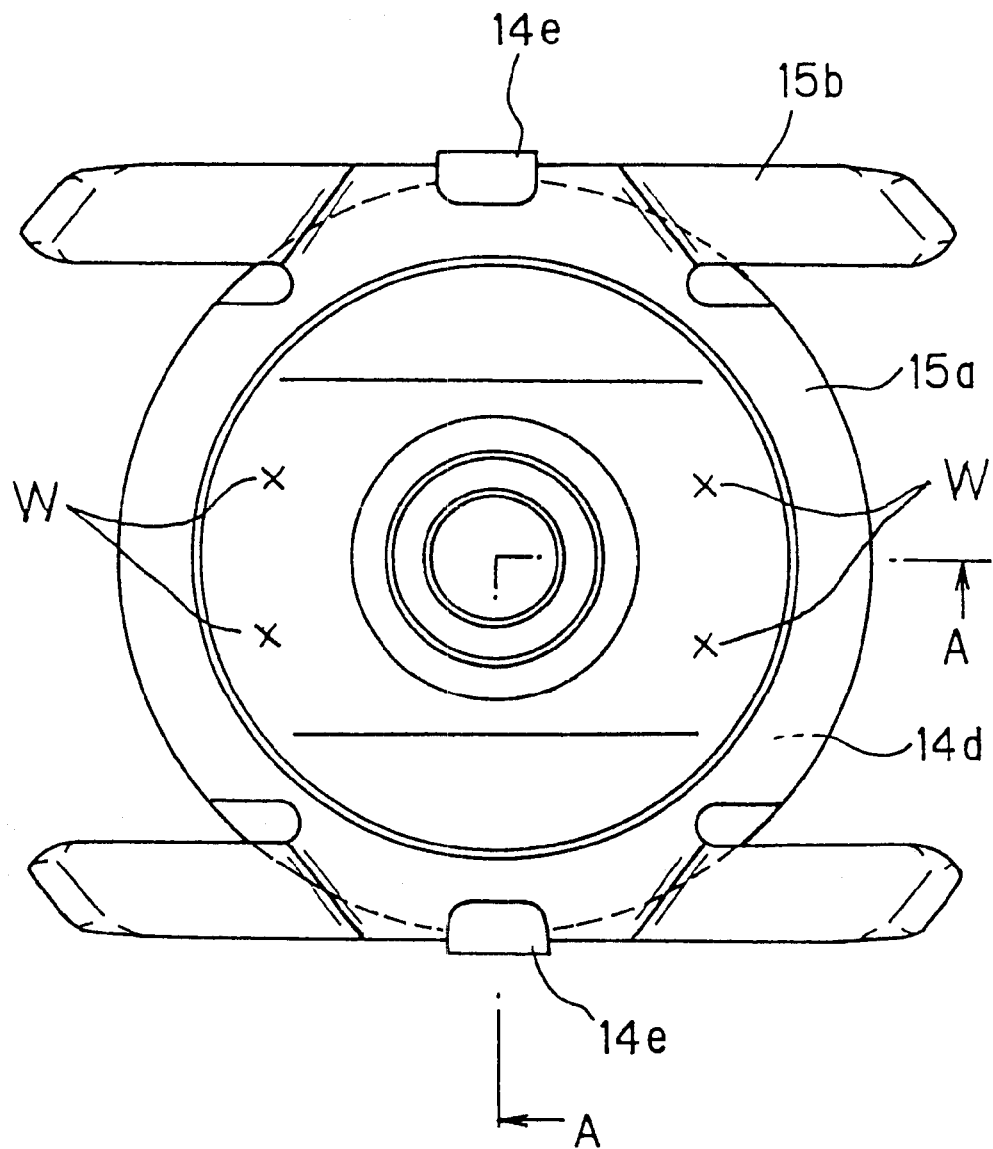
FIG. 2 is a top plan view showing a check spring.

With reference to FIGS. 1 and 2, here will be described a first embodiment of the vehicular fluid filter according to the invention.

As shown in FIG. 1, the vehicular fluid filter is constructed to include: a filter case 11 having a cylindrical container shape opened at its lower end; a cylindrical element 12 fitted in the filter case 11 for filtering oil; an inner cylinder holder 13 fitted on the inner circumference of the element 12; an element holding plate 14 for holding the element 12 downward; and a check spring 15 for applying a pushing force to the element holding plate 14. At the lower end of the inner cylinder holder 13, there is formed a flange portion 16 for supporting the lower end of the element 12. This element 12 is axially sandwiched between the element holding plate 14 and the flange portion 16. At the lower end of the filter case 11, there is disposed an end plate 17 which is threaded to be mounted on the engine block. Between the end plate 17 and the flange portion 16, there is sandwiched a packing 23. To the outer circumference of the lower face of the end plate 17, there is fixedly welded a closure plate 18. This closure plate 18 is fixedly wound on the open end of the filter case 11. In the closure plate 18, there is mounted a packing 19 which is closely fitted in the engine block.

The element 12 is formed generally into a cylindrical shape by folding a sheet of treated paper repeatedly. The ridges of the folds provide the outer circumference of a cylinder, and the valleys provide the inner circumference. To the inner circumferences of the upper end and lower end of the element 12, there are bonded seal plates 20a and 20b by an adhesive. Since the filter paper is folded, the element 12 is enlarged its total area for passing the oil while lowering the flow resistance.

The inner cylinder holder 13 is so assembled in the inner circumference of the element 12 that it can be extracted. This inner cylinder holder 13 is formed into a cylindrical shape having a small thickness and an external diameter substantially equal to that of the inner circumference of the element 12. The leading end of the inner cylinder holder 13 is cut away at its edge and is curled inward by a press or the like. In the lower end of the inner cylinder holder 13, on the other hand, there is axially press-fitted the flange portion 16. This flange portion 16 is bulged at its outer circumference into a flange shape all over the outer circumference of the inner cylinder holder 13. In the circumference of the inner cylinder holder 13, there are opened a plurality of passage ports 21 for the filtered oil to flow out therethrough to the clean side. Here, the leading end of the inner cylinder holder 13 need not be curled into the round shape but may be bent to have curved face.

The element holding plate 14 is made of a generally disc-shaped sheet and is opened at its central portion to have an opening 14a. Around the opening 14a, there is formed a downward ridge 14b. Around this ridge 14b, there is formed a step 14c. This step 14c is fitted at its inner wall face on the inner cylinder holder 13. Around the step 14c, there is formed a pressure portion 14d at a lower level.

On the lower face of the element holding plate 14, there is mounted a relief valve device 22. This relief valve device 22 is provided with: a cylindrical case 22a welded through a flange to the lower face of the element holding plate 14; a plate 22b capable of abutting against the ridge 14b; and a compression spring 22c sandwiched between the lower face of the plate 22b and the inside bottom face of the case 22a, as shown in FIG. 1. At an ordinary time, the plate 22b is urged to abut against the ridge 14c by the compression spring 22c thereby to hold the element holding plate 14 and the plate 22b in close contact. When the difference in the pressure between the clean side and the dirty side exceeds a predetermined value, the plate 22b is pushed downward against the urging force of the compression spring 22c to establish a clearance between the element holding plate 14 and the plate 22b. Since the oil of the dirty side flows through that clearance to the clean side, it is possible to prevent a trouble that the difference between the inside and outside pressures to be applied to the filter paper grows so large as to break the filter paper.

This check spring 15 is composed, as shown in FIG. 2, of an annular flange portion 15a fitted on the upper face of the pressure portion 14d, and four leaf spring portions 15b formed integral with the flange portion 15a. Since these four leaf spring portions 15b are arranged on two parallel lines extending tangentially of the annular flange portion, the check spring 15 can be stably mounted in the filter case 11 with an excellent production yield. Since the leading end portions of the leaf spring portions 15b are formed to match the contour of the inner face of the filter case 11, moreover, the stability at the mounted time can be further improved. The leaf spring portions 15b are formed by folding a sheet material. On the other hand, the check spring 15 is fixedly secured on the element holding plate 14 by bending ears 14e, as formed at the two ends of the element holding plate 14, to clamp itself. The positions where the check spring 15 is fixedly secured are set different from the positions W where the case 22a is welded to the element holding plate 14. As a result, the welded portions are not damaged by the securement treatment.

Since the secured portion formed on the outer circumference of the element holding plate is secured and fixed on the spring, the abutting portion (or seal portion) between the ridges 14b of the element holding plate and the plate 22b of the relief valve device can be prevented from deforming, to improve the contacting accuracy (or sealing property) inbetween.

Moreover, since the four leaf spring portions 15b are secured and fixed at their roots, the stability for mounting the spring in the filter case is improved. Since the two leaf spring portions arranged on a common straight line are secured and fixed at their central portions, moreover, the number of portions to be secured can be reduced while stabilizing the spring characteristics of the two leaf springs. Since the secured portions are not only different from but also the most distant from the welded portions W where the element holding plate and the relief valve device are welded, still moreover, the welded portions are not damaged at the securement step, and the securement works and the welding works can be simultaneously performed to improve the workability.

The check spring 15 is made of spring steel different from that of the element holding plate 14. When the leaf spring portions 15b come into abutment against the inner bottom of the filter case 11, they are deformed to apply the pressure to the pressure portion 14d. When the leaf spring portions 15b are inserted into the filter case 11, on the other hand, the element holding plate 14 is positioned generally at the center of the filter case 11. Here, the check spring 15 of FIG. 1 is shown in section taken along line A—A of FIG. 2.

By the elastic forces of the leaf spring portions 15b interposed between the element holding plate 14 and the filter case 11, as shown in FIG. 1, the pressure portion 14d of the element holding plate 14 pushes the seal plate 20a at the upper end of the element 12. As a result, the contact between the seal plate 20a and the pressure portion 14d is enhanced to prevent the oil leakage. By the pressure of the element holding plate 14, on the other hand, the seal plate 20b at the lower portion of the element 12 comes into close contact with the flange portion 16 of the inner cylinder holder 13. Between the inner cylinder holder 13 and the end plate 17, on the other hand, there is sandwiched the packing 23 so that the oil leakage is also prevented.

The element holding plate may preferably be made of a material having a lower elastic limit than that of the check spring. The workability is excellent especially when an SP material or the like is used.

The end plate 17 is provided with an oil inlet port 24 in its outer circumference and an oil outlet port 25 at its center. The oil, as supplied from the oil pump, flows inward from the oil inlet port 24. The oil flowing in the vicinity of the outer circumference of the filter case 11 is cleared of dust of small particle by the element 12 and flows out of the oil outlet port 25 through the passage ports 21 formed in the inner cylinder holder 13. Here, the packing 23 overlying the oil inlet port 24 has an additional function as a check valve. As a result, the oil is prevented from flowing backward or leaking to the outside when the engine is stopped or when the oil filter is removed.

Here will be described a method of assembling one embodiment of the vehicular fluid filter thus far described.

First of all, the leading end of the inner cylinder holder 13 is gradually inserted so far into the inner circumference of the element 12 as to reach the position of the flange portion 16. Since the leading end of the inner cylinder holder 13 is curled round, the inner cylinder holder 13 can be smoothly assembled in the inner circumference of the element 12 while preventing the inner circumference of the element 12 from being damaged by the sharp leading end, if any, and while enhancing the strength of the inner cylinder holder 13. Even when the leading end is bent to have a curved face although not curled round, on the other hand, the inner cylinder holder 13 can also be smoothly assembled while enhancing its strength. Here, the leading end of the inner cylinder holder 13 is rounded so that it is gradually guided by the curved face to slide into the element holding plate 14 even if slightly offset from the element holding plate 14. As a result, the inner cylinder holder 13 can be easily assembled with the element holding plate 14. To the element holding plate 14, there are fixed in advance the relief valve device 22 by the welding method and the check spring 15 by the securement method.

Next, the integrated structure of the element 12, the inner cylinder holder 13 and the element holding plate 14 is inserted into the filter case 11. Then, the packing 23 is attached to the lower end of the inner cylinder holder 13, and the closure plate 18, to which the end plate 17 is fixedly welded, is fixedly wound on the open end of the filter case 11. At this time, the size of the clearance between the upper end of the element 12 and the crest of the filter case 11 may be fluctuated by the winding height or the like of the closure plate 18. Since the check spring 15 made of the spring steel having a large elastic limit is fixedly secured to the element holding plate 14, the check spring 15 can be prevented from easily yielding to deform plastically, even with the fluctuation in the size of the clearance between the upper end of the element 12 and the crest of the filter case 11. As a result, it is possible to provide a vehicular fluid filter which can be easily assembled while requiring no high accuracy for the height sizes of the individual parts composing the fluid filter at their assembling time. The leaf spring portions 15b are bent by their abutment against the crest of the filter case 11. By the elastic forces of the leaf spring portions 15b, the element 12 is sandwiched in the vertically close contact. Here, the check spring 15 is made of the spring steel so that it can be prevented from being permanently set, to improve its function.

The secured portion of the holding plate may be fixed on the spring, and the secured portion of the spring may also be fixed on the holding plate. This modification is advantageous because the number of parts is not increased. Through the rivets or the like, however, the holding plate and the spring may be secured and fixed.

[Second Embodiment]

Figure 3:
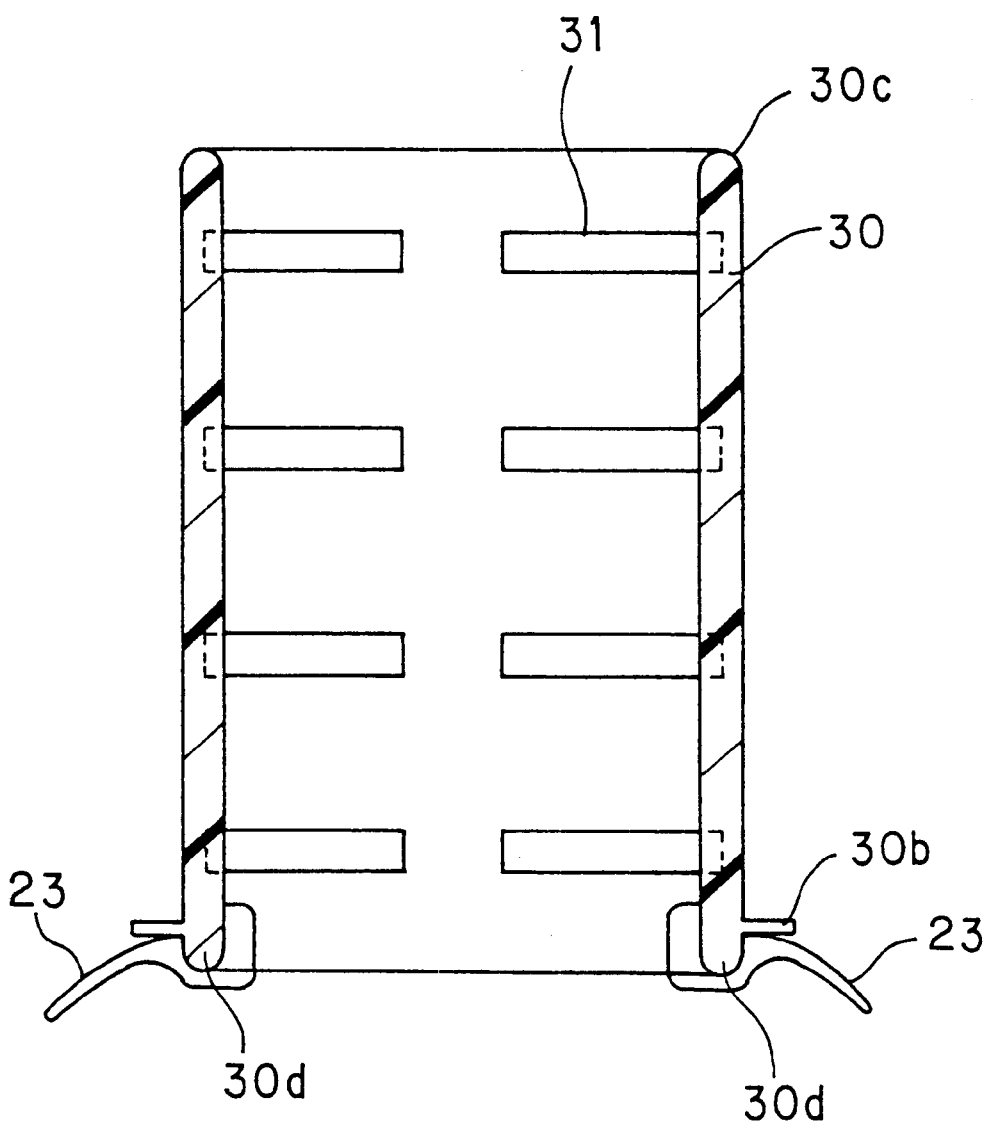
FIG. 3 is a section showing an inner cylinder holder to be used in a vehicular fluid filter of a second embodiment.

FIG. 3 shows a second embodiment of the fluid filter according to the invention. The components corresponding to those of the first embodiment will be omitted in connection with their descriptions by designating them by the common reference numerals.

An inner cylinder holder 30 to be used in the filter of the second embodiment is molded of a synthetic resin integrally with a flange portion 30b at its lower portion. The upper end 30c and the lower end 30d of the inner cylinder holder 30 are molded round. In this inner cylinder holder 30, there are formed thin oil passage slits 31 in the circumferential direction.

In the rounded lower end 30d, there is fitted a packing.

To the lower end 30d, moreover, there is applied through the packing an end plate which corresponds to the end plate 17 of the first embodiment.

Since the flange portion 30b and the lower end 30d are thus molded integrally with the inner cylinder holder 30, the number of parts can be reduced, and the step of press-fitting the flange portion axially in the inner cylinder holder 30 can be eliminated to facilitate the assembly.

Since the inner cylinder holder 30 is molded to have the round upper end 30c, on the other hand, it can be smoothly assembled like the curled inner cylinder holder 13 without damaging the inner circumference of the element 12.

[Third Embodiment]

Here will be described a third embodiment of the fluid filter according to the invention with reference to FIGS. 4 and 5. The components corresponding to those of the first embodiment will be omitted in connection with their descriptions by designating them by the common reference numerals.

Figure 4:
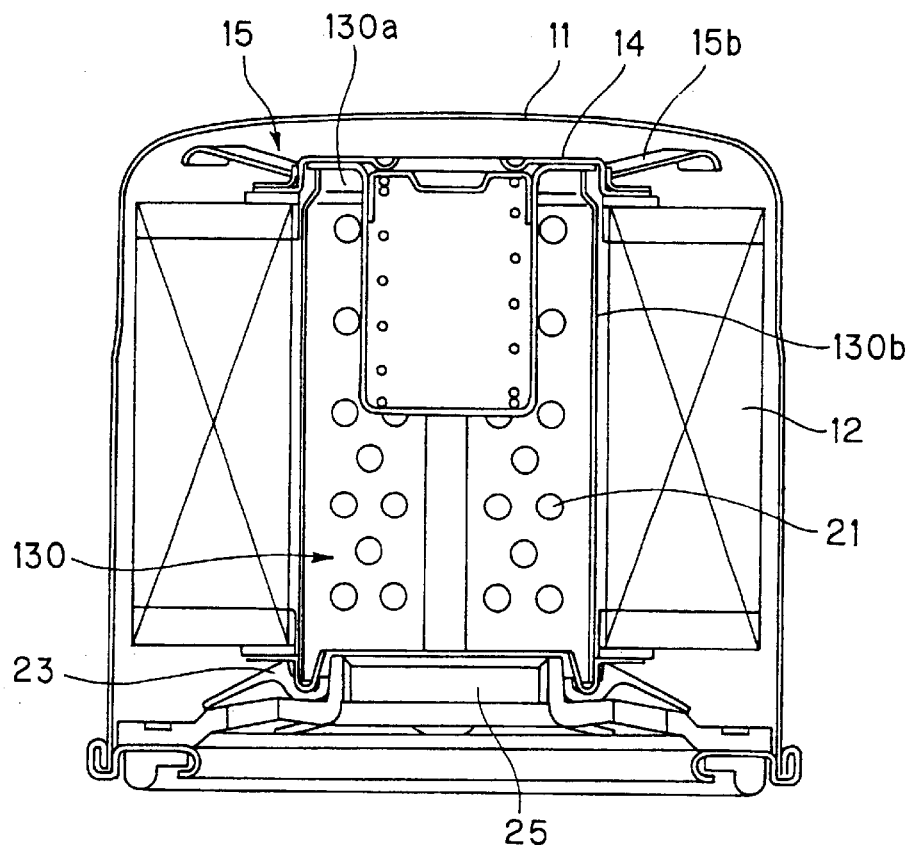
FIG. 4 is a section showing a vehicular fluid filter of a third embodiment.
Figure 5:
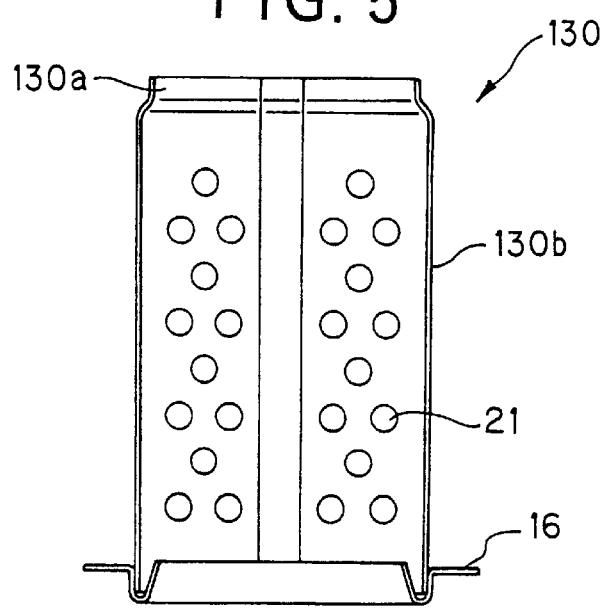
FIG. 5 is a section showing an inner cylinder holder to be used in a vehicular fluid filter of a third embodiment.

In the third embodiment, as shown in FIGS. 4 and 5, an inner cylinder holder 130 is made smaller in the external diameter of its leading end portion 130a than that of its central portion 130b. Moreover, the outer circumference of the central portion 130b of the inner cylinder holder 130, as formed to have a diameter substantially equal to the internal diameter of the element 12, is confronted by the inner circumference of the element 12.

In the third embodiment, the inner cylinder holder 130 is diametrically reduced at its leading end portion 130a so that its leading end 130a is kept away from contact with the inner circumference of the element 12 when it is inserted into the element 12. As a result, the fluid filter can be smoothly assembled without damaging the element 12. On the other hand, the leading end portion 130a may also be diametrically reduced by tapering it. Here, the constructions of the first and third embodiments may be modified such that the lower end side of the inner cylinder holder 13 or 130 is curved or diametrically reduced. Then, the inner cylinder holder can also be smoothly assembled like the first and third embodiments without damaging the inner circumference of the element, if it is inserted from its lower end portion into the element.

[Fourth Embodiment]

Here will be described a fourth embodiment of the fluid filter according to the invention with reference to FIGS. 6 and 7. The components corresponding to those of the first embodiment will be omitted in connection with their descriptions by designating them by the common reference numerals.

Figure 6:
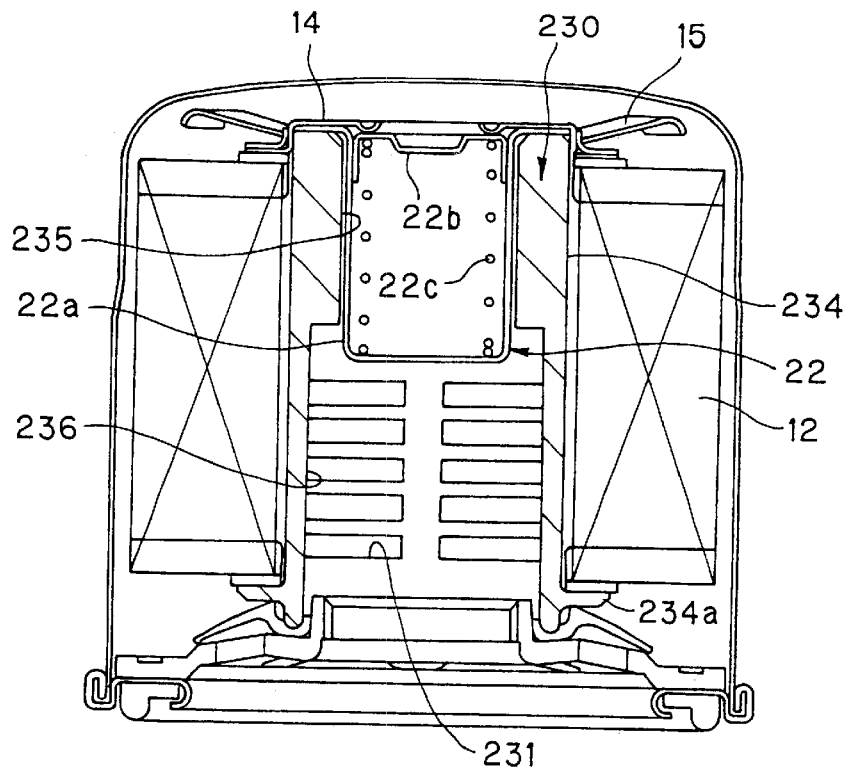
FIG. 6 is a section showing a vehicular fluid filter of a fourth embodiment.
Figure 7:
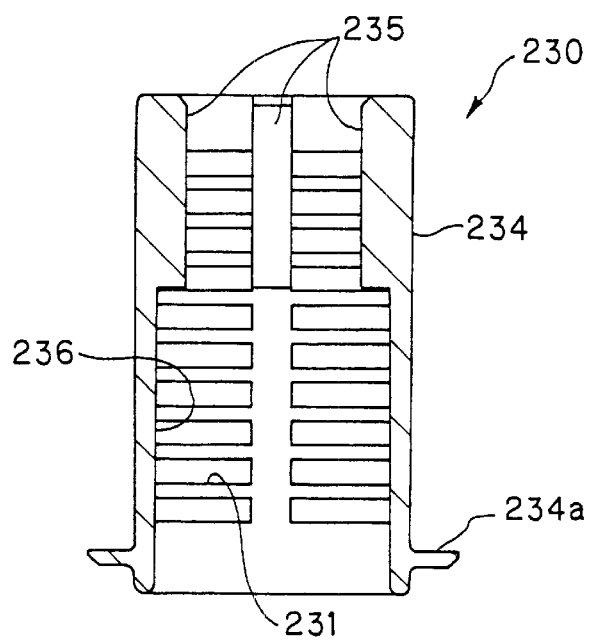
FIG. 7 is a section showing an inner cylinder holder to be used in a vehicular fluid filter of a fourth embodiment.

In the fourth embodiment, as shown in FIGS. 6 and 7, an inner cylinder holder 230 is integrally molded of a synthetic resin. In the inner cylinder holder 230, as shown in FIG. 7, there are formed a number of oil passage slits 231 for providing communication between the inside and outside of the inner cylinder holder 230. These slits 231 function like the oil passage slits 31 of the second embodiment.

The inner cylinder holder 230 is made to have an external diameter substantially equal to the internal diameter of the element 12 so that its outer circumference 234 is arranged, when assembled, along the inner circumference of the element 12. A flange portion 234a, as protruded from the outer circumference 234, functions like the flange portion 30a (of FIG. 2) in the second embodiment.

On the inner circumference of the inner cylinder holder 230, on the other hand, there are formed protrusions 235 which are protruded in the axial direction of the inner cylinder holder 230, as shown in FIG. 7. These protrusions 235 are formed by a making the inner cylinder holder 230 thicker at its upper portion so that the internal diameter of the upper portion of the inner cylinder holder 230 is made smaller than that of the inner circumference 236 of the lower portion. As shown in FIG. 6, the internal diameter of the inner cylinder holder 230 at the portion where the protrusions 235 are formed is made slightly larger than the external diameter of the case 22a of the relief valve device 22.

Thus in the fourth embodiment, the inner cylinder holder 230 is provided with the protrusions 235 at its upper portion, as compared with its lower portion, to have an internal diameter slightly larger than the case 22a. As a result, this case 22a is enabled to function as a guide for guiding the element 12 so that the inner cylinder holder 230 can be inserted in contact with the case 22a into the element 12. This guidance can smoothen the assembling works more.

In the fourth embodiment, on the other hand, the position of the inner cylinder holder 230 assembled is regulated by the case 22a. In other words, this case 22a can be utilized for centering the inner cylinder holder 230. Moreover, the thicker portions are formed at the upper portion of the inner cylinder holder so that they can enhance the strength of the inner cylinder holder. This centering function can improve the assembling accuracy.

[Fifth Embodiment]

Figure 8A:
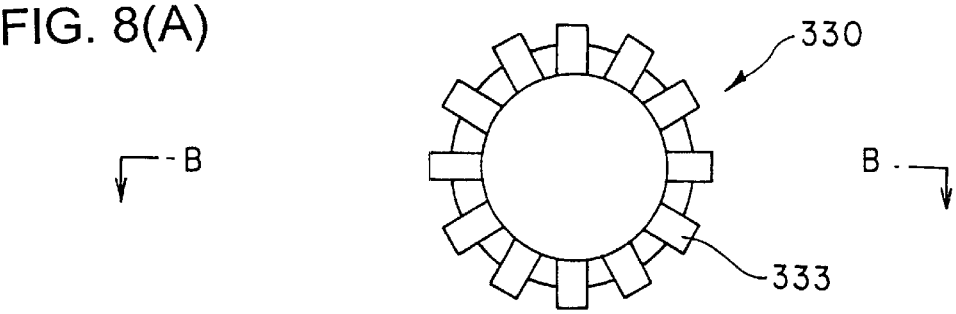
FIG. 8(A) is a top plan view showing the inner cylinder holder of the vehicular fluid filter of the third embodiment and taken along line A—A of FIG. 8(B)

Here will be described a fifth embodiment of the fluid filter according to the invention with reference to FIGS. 8(A) and 8(B). The components corresponding to those of the first embodiment will be omitted in connection with their descriptions by designating them by the common reference numerals.

In the fifth embodiment, an inner cylinder holder 330 is integrally molded of a synthetic resin. In the inner cylinder holder 330, there are formed a number of oil passage slits 331 for providing communication between the inside and outside of the inner cylinder holder 330. These slits 331 function like the oil passage slits 31 of the second embodiment.

Figure 8B:
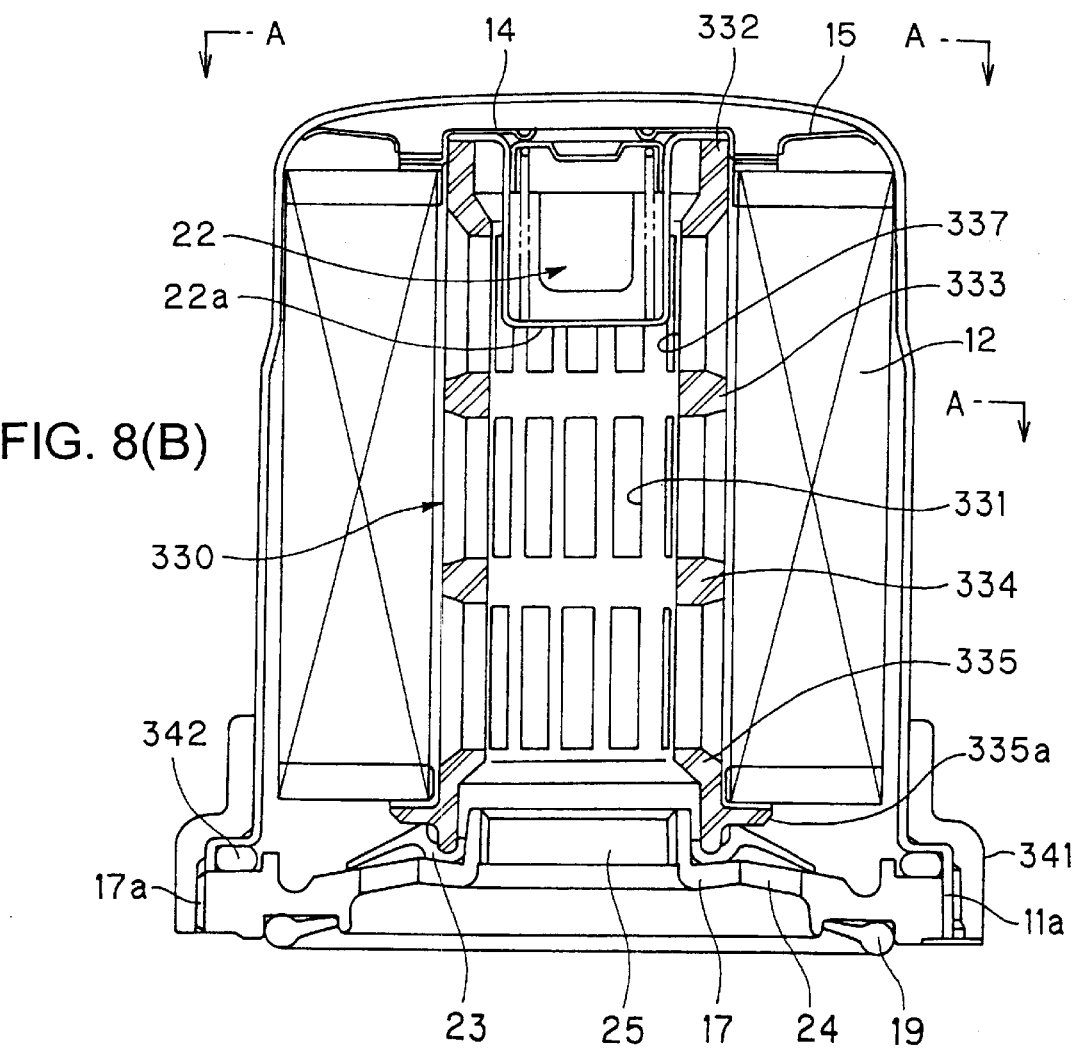
FIG. 8(B) is a section showing the vehicular fluid filter and taken along line B—B of FIG. 8(A)
Figure 9:
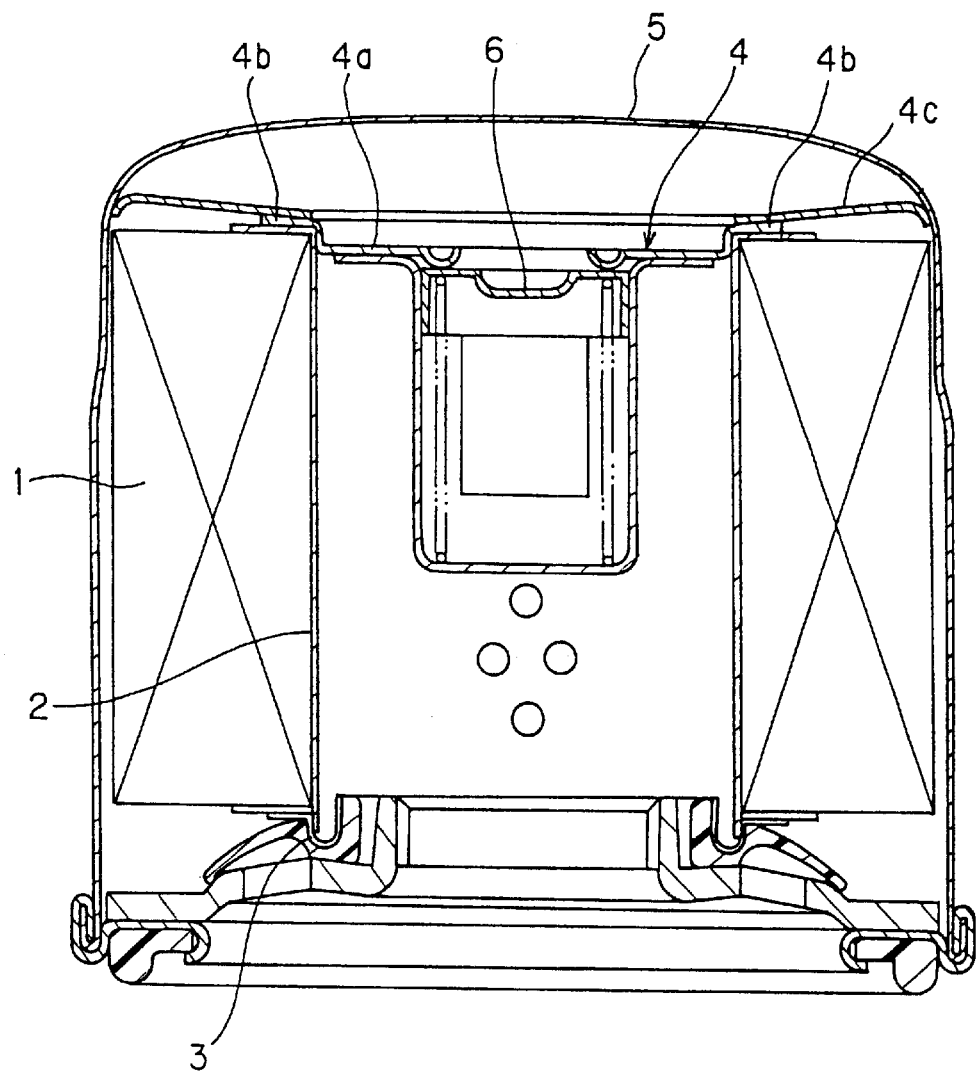
FIG. 9 is a section showing a vehicular fluid filter of the prior art.

On the outer circumference of the inner cylinder holder 330, there are formed protrusions 332, protrusions 333, protrusions 334 and protrusions 335, as designated downward in the recited order in FIG. 8(B). As shown in FIG. 8(A), the protrusions 332 to 335 are individually arranged in plurality (e.g., twelve) radially of the axis of the inner cylinder holder 330. At the portions of the protrusions 332 to 335, as shown in FIG. 8(B), the inner cylinder holder 330 is made to have an external diameter substantially equal to the internal diameter of the element 12 so that the outer circumferences of the protrusions 332 to 335 can abut against the inner circumference of the element 12. From the protrusions 335, on the other hand, there is formed a flange portion 335a which is bulged from the outer circumferences of the protrusions 335. This flange portion 335a corresponds to the flange portion 30a (of FIG. 2) in the second embodiment.

In the fifth embodiment, the outer circumference of the inner cylinder holder 330 is corrugated by forming the protrusions 332 to 335. Moreover, the inner circumference of the element 12 is contracted only by the outer circumferences of the protrusions 332 to 335 having small areas but not directly by the oil passage slits 331 located in the recesses. As a result, the substantial open area of the inner circumference of the element 12 can be enlarged so that the reduction of flow resistance and the flow speed at the open area resulting in the improvement of the filtering efficiency. On the other hand, the strength of the inner cylinder holder 330 can be enhanced by corrugating its outer circumference.

As shown in FIG. 8(B), the inner cylinder holder 330 has an internal diameter slightly larger than the external diameter of the case 22a of the relief valve device 22 so that the case 22a not only functions as a guide for the assembling works but also is utilized for centering the inner cylinder holder 330. As a result, the smooth assembly can be made in an improved accuracy.

In the outer circumference of the end plate 17, there is formed an external thread 17a, through which the end plate 17 is fastened by a ring nut 341. By screwing this ring nut 341 on the end plate 17, the filter case 11 and the end plate 17 are fastened to each other through an O-ring 342. Here in the filter case 11, there is formed a protrusion 11a to be fitted in a notch formed in the outer circumference of the end plate 17. This protrusion 11a functions as a rotation stopper between the filter case 11 and the end plate 17. Thus, the element can be replaced by a new one in the case of the filter using the ring nut.

When the inner cylinder holder is made of a synthetic resin, the molding is easy. However, the inner cylinder holder may be made of not only the synthetic resin but also another material such as aluminum. If the molding material is the synthetic resin or aluminum, it contributes to a lightening of weight.

According to one embodiment of this invention, since the element holding plate and the spring are crimpingly fixed, they can be jointed to each other even if they are made of different materials. Since a material having a higher elastic limit than that of the element holding plate can be freely selected for the spring, the spring can yield to prevent the plastic deformation even when the size between the upper end of the element and the filter case fluctuates. At the assembling time, therefore, the height sizes of the individual parts composing the vehicular fluid filter need not be accurate, and it is possible to provide a vehicular fluid filter of easy assembly.

According to another embodiment of this invention, the inner cylinder holder is curved at its end portion so that the inner cylinder holder can be smoothly assembled in the inner circumference of the element without damaging the inner circumference of the element.

According to another embodiment of this invention, the end portion of the inner cylinder holder is diametrically reduced at its end portion so that it can be smoothly assembled in the inner circumference of the element without damaging the inner circumference of the element.

According to another embodiment of this invention, the inner cylinder holder is molded integrally with the flange portion so that the number of parts can be reduced while eliminating the step of press-fitting the inner cylinder holder axially onto the flange portion, to facilitate the assembly and to enhance the strength of the inner cylinder holder by the flange portion.

According to another embodiment of this invention, the number of parts can be reduced while facilitating the assembly by molding the end portion integrally with the inner cylinder holder.

According to another embodiment of this invention, the inner circumference of the element is contacted only by the ridges formed on the outer circumference of the inner cylinder holder so that the inner cylinder holder can be easily assembled with little resistance. As a result, the open area of the inner circumference of the element can be substantially enlarged to reduce the flow resistance and lower the flow velocity at the openings thereby to improve the filtering efficiency.

According to another embodiment of this invention, when the inner cylinder holder is to be inserted into the element, the relief valve device can be utilized as a guide for inserting the inner cylinder holder thereby to smoothen the assembly.

According to another embodiment of this invention, when the inner cylinder holder is assembled into the element, the relief valve device can be utilized as a member for positioning the inner cylinder holder thereby to improve the assembling accuracy.

What is claimed is:

1. A fluid filter comprising:

a cylindrical filter case having a lower open end;

a cylindrical element inserted into the filter case;

an inner cylinder holder assembled with an inner circumference of the element such that the element can be extracted;

a metallic element holding plate fitted on an upper end of the inner cylinder holder for holding an upper end of the element; and a metallic spring fixed on the metallic element holding plate for urging the metallic element holding plate elastically to the upper end of the element;

wherein the metallic element holding plate and the metallic spring are crimpingly fixed together by bending at least one ear portion formed on the metallic element holding plate to clamp the metallic spring; and the metallic spring includes at least one leaf spring portion which extends and protrudes from a portion fixed to the metallic element holding plate.

2. The fluid filter according to claim 1, wherein the metallic spring is made of spring steel.

3. The fluid filter according to claim 1, further comprising:

a relief valve device welded to the metallic element holding plate at a position, said relief valve acting according to the difference between the inside and outside pressures of the element; and wherein the metallic spring is crimpingly fixed at a portion different from the welded position of the relief valve device.

4. The fluid filter according to claim 1, wherein the metallic spring includes a plurality of said leaf spring portions extended and protruded from the portion crimpingly fixed to the metallic element holding plate so that the metallic element holding plate is urged to the upper end of the element by an elastic force which is generated by bringing warped leaf spring portions into abutment against the filter case.

5. The fluid filter according to claim 1, wherein the inner cylinder holder is curled into round shape at its end portion so that the inner cylinder holder is inserted from its end portion into the element.

6. The fluid filter according to claim 5, wherein the end portion of the inner cylinder holder is curled inwardly.

* * * * *